(12) United States Patent
Keohane et al.

(10) Patent No.: US 8,037,137 B2
(45) Date of Patent: Oct. 11, 2011

(54) METHOD AND SYSTEM FOR EFFICIENT ATTACHMENT OF FILES TO ELECTRONIC MAIL MESSAGES

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2527 days.

(21) Appl. No.: 10/406,651

(22) Filed: Apr. 3, 2003

(65) Prior Publication Data

US 2004/0199588 A1 Oct. 7, 2004

(30) Foreign Application Priority Data

Apr. 4, 2002 (JP) .................. 2002-102923

(51) Int. Cl.
*G06F 15/16* (2006.01)
(52) U.S. Cl. ...................................... 709/206
(58) Field of Classification Search .......... 709/206, 709/207
See application file for complete search history.

(56) References Cited

U.S. PATENT DOCUMENTS

| | | | | |
|---|---|---|---|---|
| 5,331,613 A * | 7/1994 | Yamada | ...... | 369/30.26 |
| 5,613,108 A * | 3/1997 | Morikawa | ...... | 1/1 |
| 5,771,355 A * | 6/1998 | Kuzma | ...... | 709/232 |
| 5,781,901 A * | 7/1998 | Kuzma | ...... | 1/1 |
| 5,801,700 A * | 9/1998 | Ferguson | ...... | 715/748 |
| 5,826,252 A * | 10/1998 | Wolters et al. | ...... | 717/101 |
| 5,903,723 A * | 5/1999 | Beck et al. | ...... | 709/200 |
| 6,073,133 A * | 6/2000 | Chrabaszcz | ...... | 1/1 |
| 6,216,122 B1 * | 4/2001 | Elson | ...... | 1/1 |
| 6,266,682 B1 * | 7/2001 | LaMarca et al. | ...... | 715/234 |
| 6,405,225 B1 * | 6/2002 | Apfel et al. | ...... | 715/210 |
| 6,453,338 B1 * | 9/2002 | Shiono | ...... | 709/206 |
| 6,505,236 B1 * | 1/2003 | Pollack | ...... | 709/206 |
| 6,546,417 B1 * | 4/2003 | Baker | ...... | 709/206 |
| 6,582,474 B2 * | 6/2003 | LaMarca et al. | ...... | 715/234 |
| 6,687,741 B1 * | 2/2004 | Ramaley et al. | ...... | 709/206 |
| 6,859,213 B1 * | 2/2005 | Carter | ...... | 715/752 |
| 6,898,622 B1 * | 5/2005 | Malik | ...... | 709/206 |
| 6,907,573 B2 * | 6/2005 | Kohls et al. | ...... | 715/764 |
| 6,970,908 B1 * | 11/2005 | Larky et al. | ...... | 709/206 |
| 7,003,551 B2 * | 2/2006 | Malik | ...... | 709/206 |

(Continued)

OTHER PUBLICATIONS

Habraken, Joseph W., Sams teach yourself Microsoft Outlook 2000 in 10 minutes, 1999, Sams Publishing, pp. 91-93.*

*Primary Examiner* — Wing Chan
*Assistant Examiner* — Alicia Baturay
(74) *Attorney, Agent, or Firm* — Dillon & Yudell LLP

(57) ABSTRACT

A data processing system for efficiently attaching files to electronic mail message. In a multi-level hierarchical file storage system within the data processing system wherein one or more files may be active, only those files, which are active, are initially proffered as candidates for attachment in response to a user's indicated desire to attach a file to an electronic mail message. If the user fails to select an active file for attachment, the user is prompted to select a file from the multi-level hierarchical file storage system for attachment. After attachment, the electronic mail message and attachment are transmitted.

12 Claims, 6 Drawing Sheets

U.S. PATENT DOCUMENTS

| | | | |
|---|---|---|---|
| 7,007,066 B1* | 2/2006 | Malik | 709/206 |
| 7,016,937 B1* | 3/2006 | Malik | 709/206 |
| 7,086,003 B2* | 8/2006 | Demsky et al. | 715/201 |
| 7,092,993 B2* | 8/2006 | Goldberg | 709/206 |
| 7,130,887 B2* | 10/2006 | Goldberg | 709/206 |
| 7,296,060 B2* | 11/2007 | Walsh | 709/208 |
| 2001/0039553 A1* | 11/2001 | LaMarca et al. | 707/501.1 |
| 2001/0047456 A1* | 11/2001 | Schrobenhauzer et al. | 711/122 |
| 2002/0010748 A1* | 1/2002 | Kobayashi et al. | 709/206 |
| 2002/0116575 A1* | 8/2002 | Toyomura et al. | 711/115 |
| 2002/0138579 A1* | 9/2002 | Goldberg | 709/206 |
| 2003/0023697 A1* | 1/2003 | Okada | 709/206 |
| 2004/0044723 A1* | 3/2004 | Bell et al. | 709/203 |
| 2004/0068545 A1* | 4/2004 | Daniell et al. | 709/206 |
| 2004/0158607 A1* | 8/2004 | Coppinger et al. | 709/206 |
| 2004/0215597 A1* | 10/2004 | Fitzgerald et al. | 707/1 |
| 2004/0220925 A1* | 11/2004 | Liu et al. | 707/3 |
| 2005/0289452 A1* | 12/2005 | Kashi et al. | 715/512 |
| 2006/0026236 A1* | 2/2006 | Scian et al. | 709/206 |

* cited by examiner

METHOD AND SYSTEM FOR EFFICIENT ATTACHMENT OF FILES TO ELECTRONIC MAIL MESSAGES

BACKGROUND OF THE INVENTION

1. Technical Field

The present invention relates in general to an improved data processing system and, in particular, to an improved method and system for the administration of electronic mail. Still more particularly, the present invention relates to a method and system for efficiently attaching a file to an electronic mail message.

2. Description of the Related Art

The Internet is the world's largest information network. It is comprised of a matrix of many connected computers, which is decentralized and controlled by system administrators all over the world. Information is exchanged and regulated through a protocol known as Transmission Control Protocol/Internet Protocol (TCP/IP), which define the manner in which computers within this network can exchange information.

Perhaps one of the greatest impacts of the Internet is the availability of electronic mail or "e-mail" programs, which permit users to transmit communications from any place within the Internet to another location.

Electronic mail can be accomplished by logging into a mail system utilizing an account name and password. Electronic mail programs generally permit a user to check mail and display a list of messages within a mailbox, select a message to be read, create new messages and transmit those messages, and add file attachments such as pictures or other documents from a local computer to a message before transmitting that message.

Electronic mail messages are transmitted throughout the Internet and relayed to an ultimate destination by a path, which may travel many different routes, traveling through a multitude of computer servers before reaching a destination. The amount of time this process takes is a function of the amount of traffic within the servers at the time of transmittal, and in a situation in which a particular server may not be functioning properly, messages may be placed in temporary storage until the mail server regains functionality.

Messages, which cannot be delivered, are returned or "bounced" back to the originator with a message added indicating that the mail message could not be transmitted.

Referring again to the attachment of a file, photograph, or other object to an electronic mail message, the process typically occurs by prompting a user to select a particular file for attachment from the storage media associated with the user's computer. This is usually accomplished by presenting the user with a listing of the hierarchical file storage system present within a computer and permitting the user to either browse or select a particular file or object to be attached to an electronic mail message. Before this can be accomplished, the user must either locate the file to be attached by selecting the appropriate directory and the correct file name, or must browse through a large number of files to identify the particular file to be attached.

It should therefore be apparent that a need exists for a method for more efficient attachment of a file to an electronic mail message.

SUMMARY OF THE INVENTION

It is therefore one object of the present invention to provide an improved data processing system.

It is another object of the present invention to provide an improved method and system for the administration of electronic mail.

It is yet another object of the present invention to provide an improved method and system for efficiently attaching a file to an electronic mail message for transmission.

The foregoing objects are achieved as is now described. A data processing system is provided for efficiently attaching files to electronic mail messages in accordance with the present invention. In a multi-level hierarchical file storage system within the data processing system wherein one or more files may be active, only those files which are active are initially proffered as candidates for attachment, in response to a user's indicated desire to attach a file to an electronic mail message. If the user fails to select an active file for attachment, the user is prompted to select a file from the multi-level hierarchical file storage system for attachment. After attachment, the electronic mail message and attachment are transmitted.

BRIEF DESCRIPTION OF THE DRAWINGS

The novel features believed characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
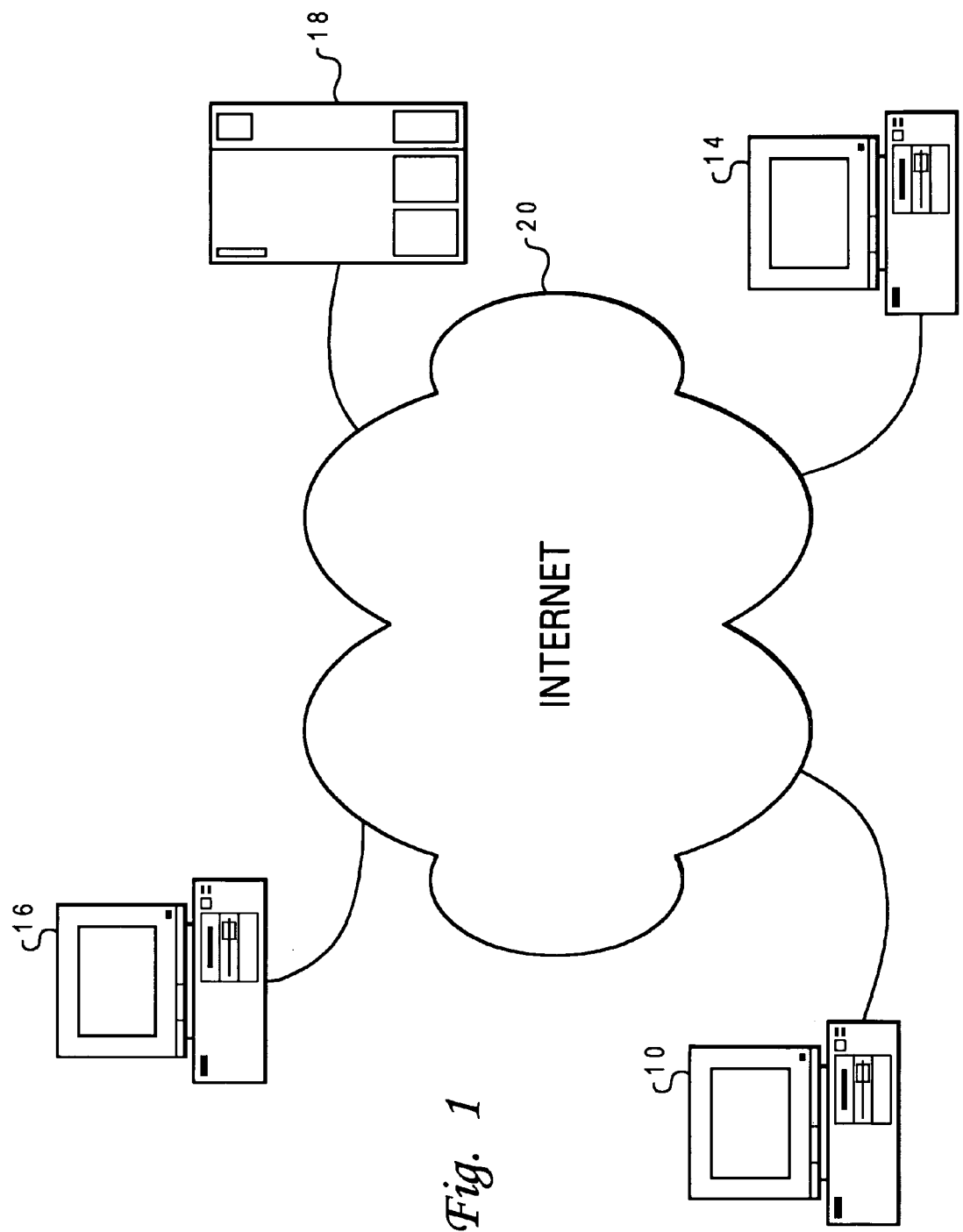
FIG. 1 is a schematic representation of a plurality of data processing systems linked together over a network, within which the method and system of the present invention may find application.

With reference now to the Figures and in particular with reference to FIG. 1, there is depicted a schematic representation of a plurality of data processing systems linked together over a network, within which the method and system of the present invention may find application. As illustrated, data processing systems 10, 14, 16 and 18 are linked together via any network over which electronic mail communication may occur. In the depicted embodiment within FIG. 1, the Internet 20 is the method by which such electronic mail communication takes place. As illustrated, data processing systems 10, 14, 16 and 18, may be implemented utilizing a so-called "personal" computer such as the Aptiva series personal computer manufactured by International Business Machines of Armonk, N.Y. Similarly, data processing system 18 may be implemented utilizing a mid-level computer, server or workstation device. In a typical network of the type depicted, many thousands of computers, servers, workstations, or the like, may be linked.

Thus, as depicted within FIG. 1, multiple data processing systems may be linked together and electronic mail communication between those data processing systems may be limited to those individuals possessing the appropriate user identification and password, which permits access to files, accounts, or data stored within another data processing system.

Figure 2:
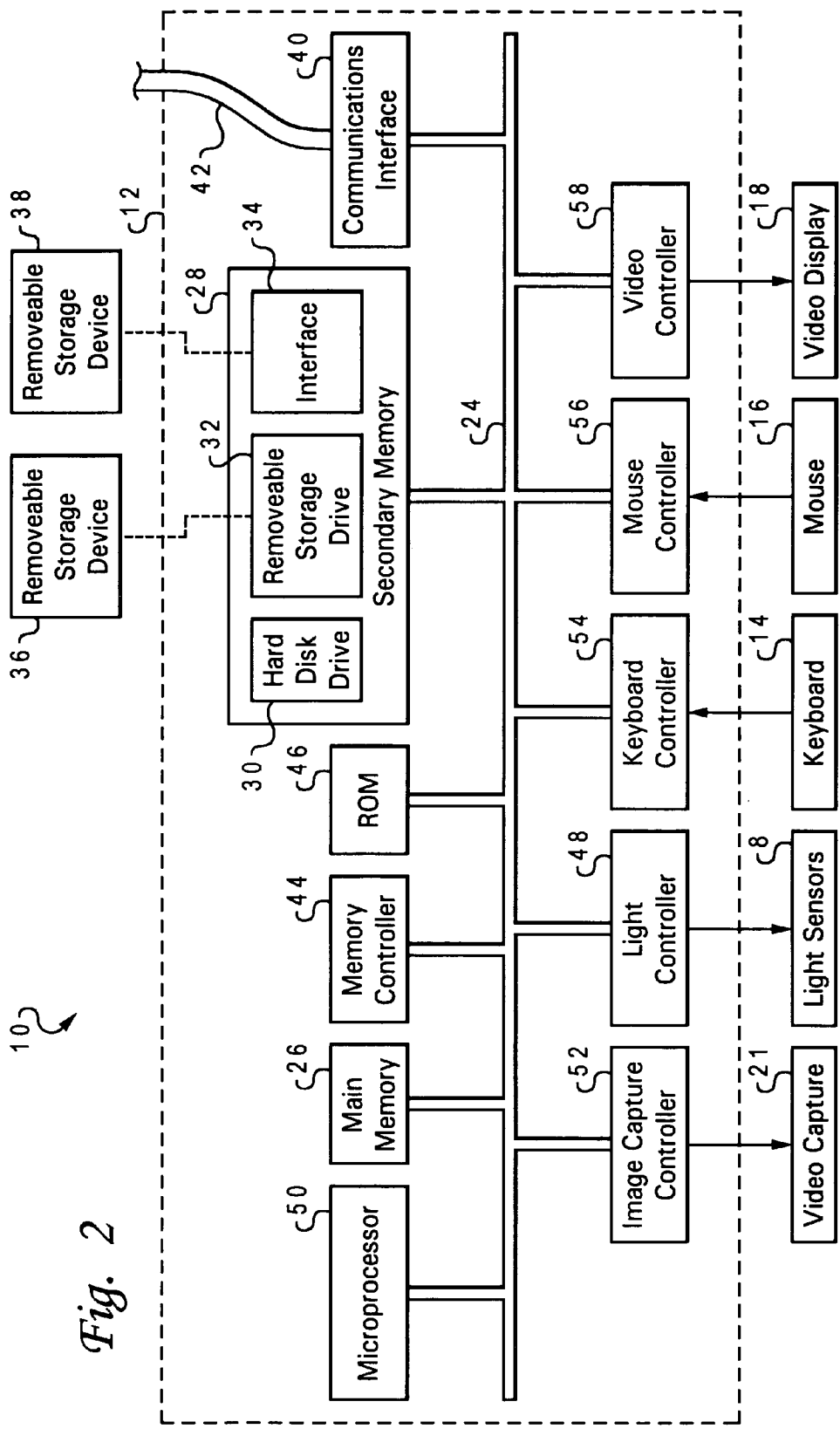
FIG. 2 is a high-level block diagram of one of the data processing systems of FIG. 1 which may be utilized to implement the method and system of the present invention.

Referring now to FIG. 2, there is depicted a data processing system environment for implementing the present invention. The environment is a processor unit 12 within data processing system 10 that includes one or more processors such as microprocessor 50. Microprocessor 50 is connected to a system bus 24. Various software embodiments are described in terms of this example data processing system. After reading the description, it will be apparent to a person skilled in the relevant art how to implement the invention using other data processing systems and/or data processing system architectures.

Processor unit 12 also includes a main memory 26, which preferably comprises random access memory (RAM). In addition, a secondary memory 28 may be included. Secondary memory 28 may include, for example, a hard disk drive 30, a removable storage drive 32, and an interface 34. Removable storage drive may represent a floppy disk drive, magnetic tape drive, an optical disc drive, or other data drive, which reads and writes to a removable storage unit 36. Removable storage unit 36 represents a floppy disk, magnetic tape, optical disk, or any other data storage device, which is read by and written to by removable storage drive 32. As will be appreciated, removable storage unit 36 includes a computer usable storage medium having stored therein computer software and/or data.

In alternative embodiments, secondary memory 28 may include other similar means for allowing computer programs, or other instructions to be loaded into processor unit 12. Such means may include, for example, a removable storage unit 38 and interface 34. Examples may include a program cartridge and cartridge interface, a removable chip (such as EEPROM, PROM, or PCMCIA) and associated socket, and other removable storage units 38 and interfaces 34 which allow software and data to be transferred from removable storage unit 28 to data processing system 10.

Data processing system 10 preferably includes a memory controller 44, connected to system bus 24, for controlling all Direct Memory Access (DMA) operations such as paging data between main memory 26 and secondary memory 28. In addition, random access memory (ROM) 46 contains, amount other code, the Basic Input/Output System (BIOS) or other firmware which controls certain basic hardware operations, such as interactions of hard disk drive 30 and removable storage drive 32.

Data processing system 10 may also include a communications interface 40. Communications interface 40 allows software and data to be transferred between data processing system 10 and external devices via communications path 42. Examples of communications interface 40 include a modem, printer, communications port, and other communications supporting hardware. A modem allows data processing system 10 to communicate with other data processing systems over the Internet through a communications path including but not limited to public switched telephone network (PSTN) or ISDN lines. Electronic mail messages, software and data transferred via communications interface 40 are in the form of signals that can be electronic, electromagnetic, optical, or other signals capable of being received or sent by communications interface 40 via communications path 42. In particular, communications interface 40 provides a means by which data processing system 10 may interface a network such as Internet 20.

Within data processing system 10, there are five additional input/output (I/O) controllers, namely, light controller 48, image capture controller 52, keyboard controller 58, all of which are connected to system bus 24. As their names imply, light controller 48 provides the hardware interface for light sensors 8 and image capture controller 52, keyboard controller 54, mouse controller 56 and video controller 58, all of which are connected to system bus 24. As their names imply, light controller 48 provides the hardware interface for light sensors 8 and image capture controller 52 provides the hardware interface for video capture device 21. Further, keyboard 14, mouse controller 56 provides the hardware interface for mouse 16, and video controller 58 provides the hardware interface for video display 18.

The present invention is preferably implemented utilizing software executing in a data processing system environment similar to that described above with respect to FIG. 2. Thus, the term "computer program product" is used to generally refer to a program stored at removable storage drive 32 or hard disk installed in hard disk drive 30. These computer program products are means for providing software to data processing system 10.

Computer programs or computer control logic are stored in main memory 26 and/or secondary memory 28. Computer programs can also be received via communications interface 40. Such computer programs, when executed, enable data processing system 10 to perform the features of the present invention as discussed herein. In particular, the computer programs, when executed, enable microprocessor 22 to perform the features of the present invention. Accordingly, such computer programs represent controllers of data processing system 10.

Figure 3:
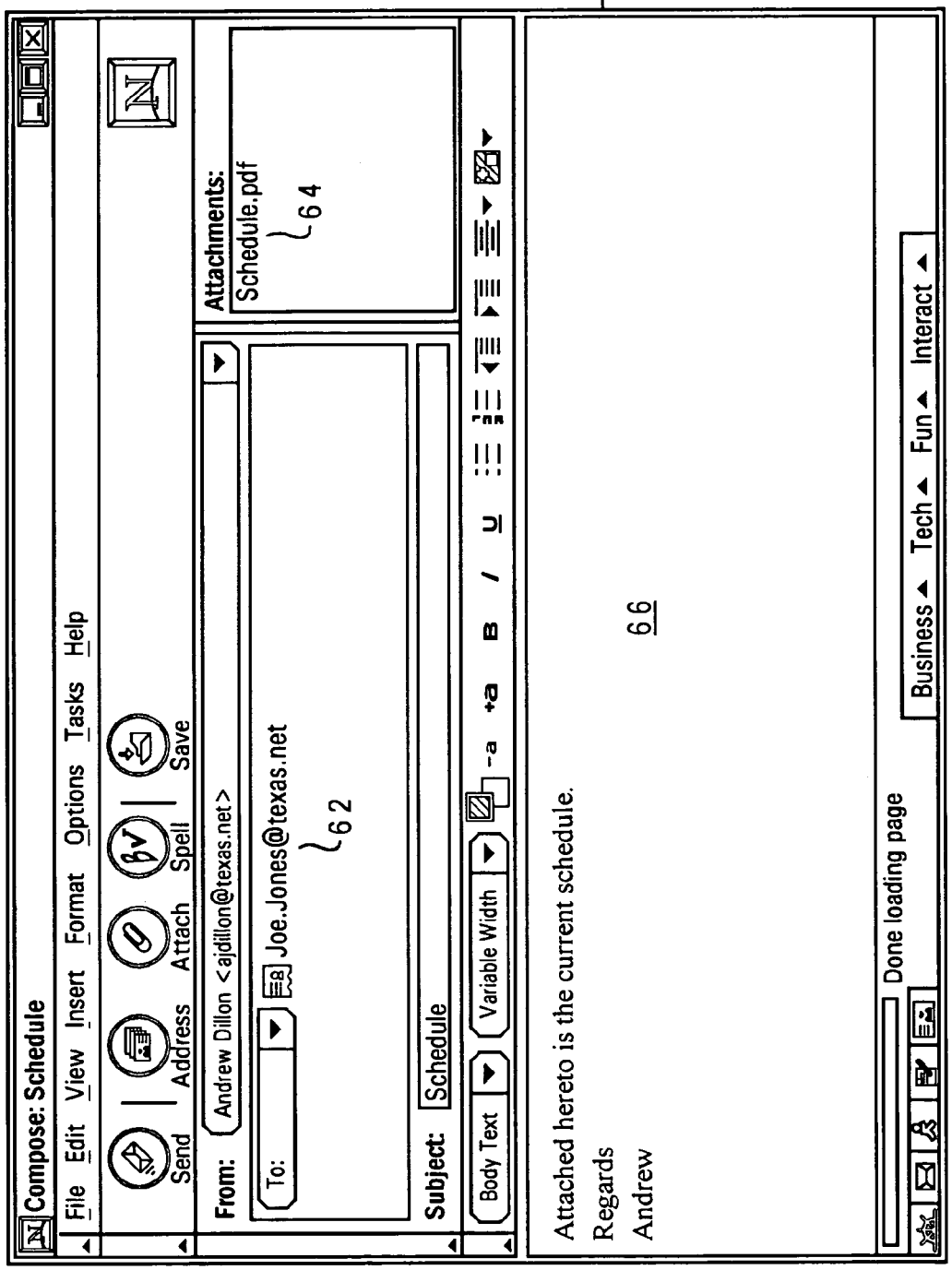
FIG. 3 is a pictorial representation of an electronic mail message including an attached file, which may be selected in accordance with the method and system of the present invention.

With reference now to FIG. 3 there is depicted a pictorial representation of an electronic mail message including an attached file which may be selected in accordance with the method and system of the present invention. As illustrated, a window 60 for composing an electronic mail message is depicted. As is common in such systems, the user may select an addressee 62 and create the text of the electronic mail message within display window 66. Also depicted within FIG. 3 is a portion of the window 60 wherein attachments may be listed. As depicted, the attachment "schedule.pdf" 64 is listed as attached to the electronic mail message composed within window 60.

Figure 4:
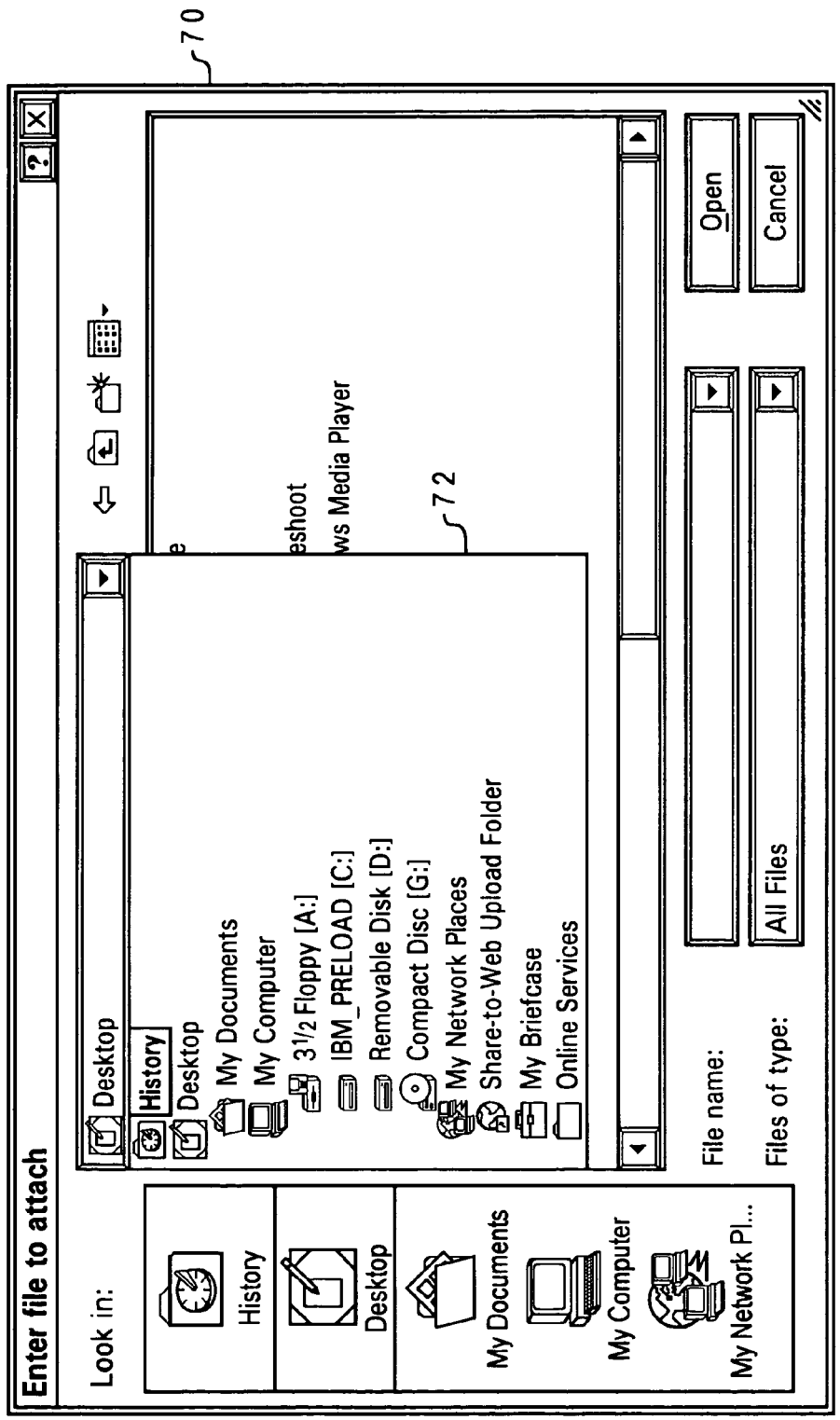
FIG. 4 is a pictorial representation of a prior art technique for selecting a file for attachment to an electronic mail message.

Referring now to FIG. 4, there is depicted a pictorial representation of a prior art technique for selecting a file for attachment to an electronic mail message. As illustrated, a window 70 is displayed in response to an indication from the user that attachment to an electronic mail message is desired. In response to such indication, a listing 72 of the multi-level hierarchical storage system within the computer is depicted and, in a manner well known to those having ordinary skill in the art, a particular storage disk, directory, or file may be selected. Those having ordinary skill in art will appreciate that modern computer systems which include extensive storage capacity may include thousands of directories and files which may provide the source for an attachment to an electronic mail message.

Figure 5:
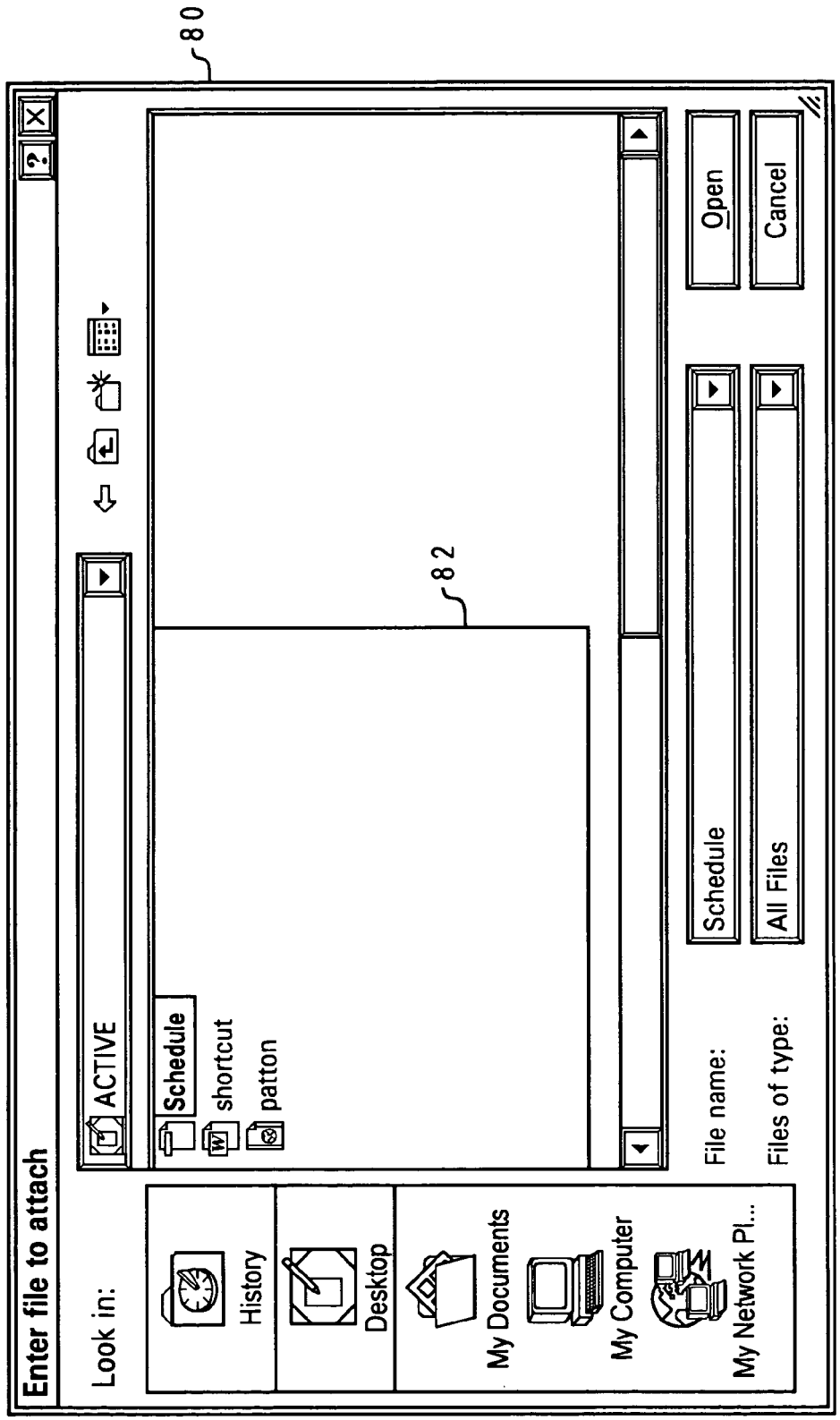
FIG. 5 is a pictorial representation of a technique for selecting a file for attachment to an electronic mail message in accordance with the method and system of the present invention.

With reference now to FIG. 5 there is depicted a pictorial representation of a technique for selecting a file for attachment to an electronic mail message in accordance with the method and system of the present invention. As illustrated, upon an indication by the user that attachment of a file or other object to an electronic mail message is desired, window 80 is displayed. Within subwindow 82 are a list of all files which are currently active within the multi-level hierarchical data file storage system within the subject computer. This technique provides a much more efficient method for selecting a file for attachment in recognition of the normal workflow of a computer user. In such a process, the user typically creates a file attachment and thereafter transmits the file attachment. Thus, as depicted within FIG. 5, the proffering of only those files which are currently active within the multi-level hierarchical file storage system makes it likely that the desired file or object to be selected for attachment will be more readily identified, without requiring the user to either know the actual directory and file name, or search through an extensive number of such directories to locate the desired file.

Figure 6:
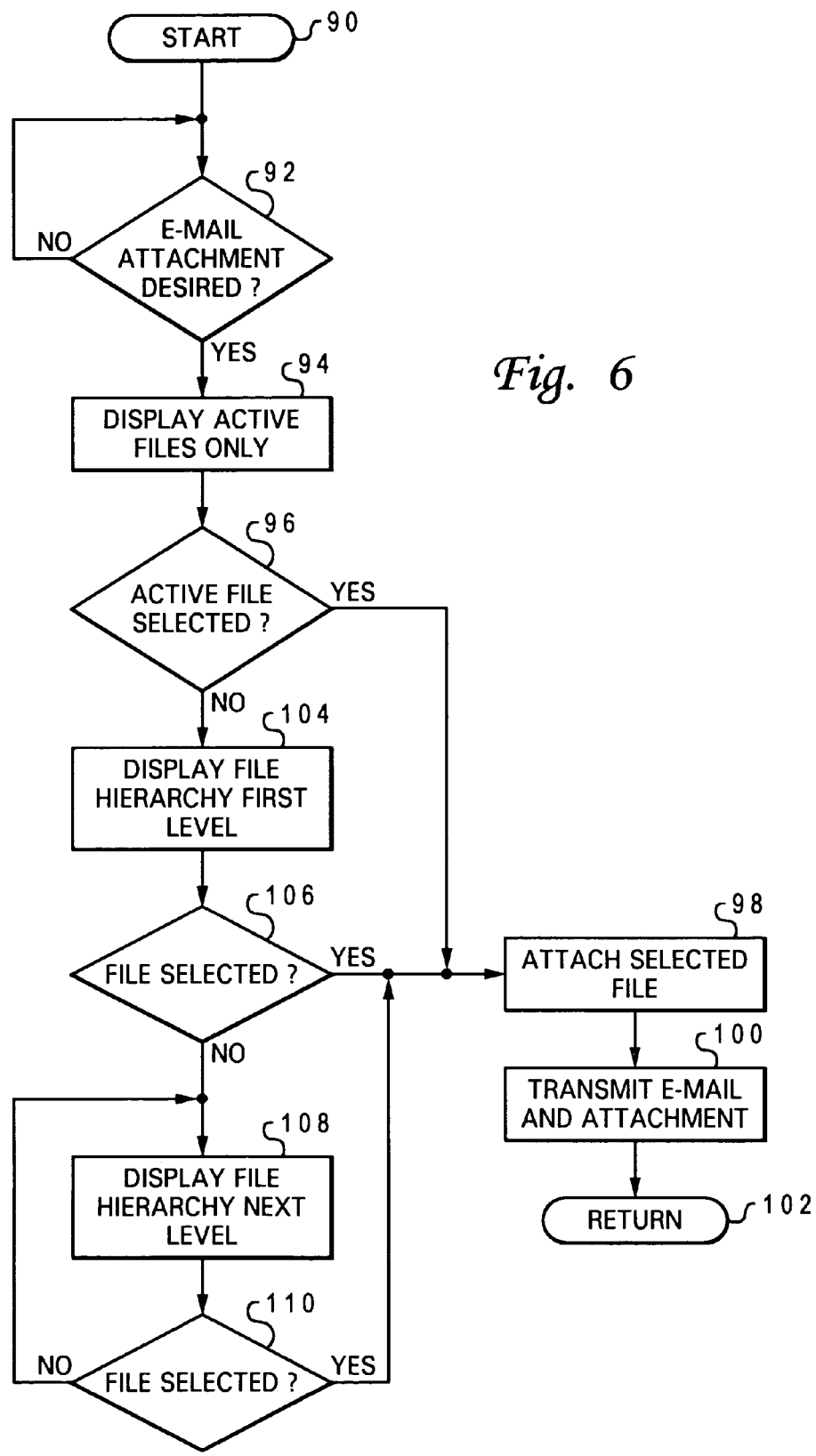
FIG. 6 is a high-level logic flow chart, which illustrates a method for selecting a file for attachment to an electronic mail message in accordance with the method and system of the present invention.

Referring now to FIG. 6, there is depicted a high-level logic flow chart, which illustrates the method for selecting a file for attachment in accordance with the method and system of the present invention. As depicted, this process begins at block 90 and thereafter passes to block 92. Block 92 illustrates a determination of whether or not the user has indicated a desire to attach a file, photograph, document or other object to a currently composed electronic mail message. Those having skill in this art will appreciate that this desire may be indicated by the selection of an icon indicating "attach" or other similar techniques. In the event no such indication occurs, the process merely returns, in an iterative fashion, to block 92 to await an indication from the user that attachment of a file or other object is desired.

Still referring to block 92, in the event an indication of the user's desire to attach a file or other object to an electronic mail message is indicated, the process passes to block 94. Block 94 depicts the display of only those files within the multi-level hierarchical file storage system, which are currently active. Thereafter, the process passes to block 96.

Block 96 depicts a determination of whether or not one of the proffered active files has been selected, and if so, the process passes to block 98. Block 98 depicts the attachment of the selected file and the process then passes to block 100, which illustrates the transmittal of the electronic mail message with the selected attachment. Thereafter, the process passes to block 102 and returns.

Referring again to block 96, in the event an active file is not selected, the process passes to block 104. Block 104 illustrates the displaying of the multi-level hierarchical file storage system at a first or default level. Thereafter, the process passes to block 106.

Block 106 depicts a determination of whether or not a particular file has been selected from this level within the multi-level hierarchical file storage system and if so, the process passes to block 98 and, as described above, the selected file is attached and transmitted with the electronic mail message.

Referring again to block 106, in the event a file is not selected from the first level within the multi-level hierarchical file storage system, the process passes to block 108. Block 108 depicts the display of the next level within the multi-level hierarchical file storage system and thereafter, as depicted at block 110, a determination is made as to whether or not a file from this hierarchical level has been selected. Again, if a file is selected, the process passes to block 98 and, as described above, the selected file is attached and transmitted with the electronic mail message.

Still referring to block 110, in the event a file has not been selected for attachment, the process returns to block 108 and the next level within the multi-level hierarchical file storage system is displayed for possible selection of a file for attachment.

In this manner, as those skilled in the art will appreciate, by initially proffering only those files which are active within a multi-level hierarchical file storage system it is likely that the desired file to be selected for attachment will be rapidly and efficiently identified. Alternatively, in the event the file to be attached is not an active file, the process proceeds in the manner previously known in the art wherein a particular file is selected for attachment from among the files stored within the multi-level hierarchical file storage system.

While the invention has been particularly shown and described with reference to a preferred embodiment, it will be understood by those skilled in the art that various changes in form and detail may be made therein without departing from the spirit and scope of the invention.

What is claimed is:

1. A method for efficient attachment of a file to an electronic mail message in a data processing system having a multi-level hierarchical file storage system, wherein one or more files maybe active within the data processing system, said method comprising the steps of:
    initially proffering only those files which are active within said data processing system as candidates for attachment in response to a user input indicating a desire to attach a file to an electronic mail message; and
    thereafter prompting a user to select a file from said multi-level hierarchical file storage system in response to a failure of a user to select a proffered active file for attachment.

2. The method for efficient attachment of a file to an electronic mail message in a data processing system according to claim 1, further including the step of transmitting said electronic mail message after attachment to a file thereto.

3. The method for efficient attachment of a file to an electronic mail message in a data processing system according to claim 1, wherein said step of thereafter prompting a user to select a file from said multi-level hierarchical file storage system in response to a failure of a user to select a proffered active file for attachment comprises the step of prompting a user to select a file from a current level of sale multi-level hierarchical file storage system.

4. The method for efficient attachment of a file to an electronic mail message in a data processing system according to claim 3, further including the step of prompting a user to select a file from a next level of said multi-level hierarchical file storage system in response to a failure of said user to select a file from said current level of such multi-level hierarchical file storage system.

5. The method for efficient attachment of a file to an electronic mail message in a data processing system according to claim 1, further including the step of graphically indicating selection of a file for attachment.

6. A data processing system for efficient attachment of a file to an electronic mail message, said data processing system comprising:
    a multi-level hierarchical file storage system wherein one or more files may be active within said data processing system;
    means for initially proffering only those files which are active within said data processing system as candidates for attachment in response to a user input indicating a desire to attach a file to an electronic mail message; and means for thereafter prompting a user to select a file from said multi-level hierarchical file storage system in response to a failure of a user to select a proffered active file for attachment.

7. The data processing system for efficient attachment of a file to an electronic mail message according to claim 6, further including means for transmitting said electronic mail message after attachment of a file.

8. The data processing system for efficient attachment of a file to an electronic mail message according to claim 6, when said means for thereafter prompting a user to select a file from said multi-level hierarchical file storage system in response to a failure of a user to select a proffered active file for attachment, comprises means for prompting a user to select a file from a current level of said multi-level hierarchical file storage system.

9. The data processing system for efficient attachment of a file to an electronic mail message according to claim 8, further including means for prompting a user to select a file from a next level of said multi-level hierarchical file storage system in response to a failure of said user to select a file from said current level of said multi-level hierarchical file storage system.

10. The data processing system for efficient attachment of a file to an electronic mail message according to claim 6, further including means for graphically indicating selection of a file for attachment.

11. A computer program product for efficient attachment of a file to an electronic mail message in a data processing system, having a multi-level hierarchical file storage system wherein one or more files may be active within the data processing system, said computer program product comprising:

computer storage device;

instruction means embodied within said computer storage device for initially proffering only those files which are active within said data processing system as candidates for attachment in response to a user input indicating a desire to attach a file to an electronic mail message; and instruction means embodied within said computer storage device for thereafter prompting a user to select a file from said multi-level hierarchical file storage system in response to a failure of a user to select a proffered active file for attachment.

12. A computer program product for efficient attachment of a file to an electronic mail message in a data processing system according to claim 11, further including instruction means embodied within said computer storage device for transmitting said electronic mail message after attachment of a file.

* * * * *